United States Patent [19]
Wells

[11] Patent Number: 5,563,905
[45] Date of Patent: Oct. 8, 1996

[54] NETWORK COMMUNICATION SYSTEM HAVING TIME-SLICED PROTOCOL

[75] Inventor: Daniel H. Wells, Redondo Beach, Calif.

[73] Assignee: Hughes Aircraft Company, Los Angeles, Calif.

[21] Appl. No.: 951,503

[22] Filed: Sep. 24, 1992

[51] Int. Cl.⁶ .................................................. H04B 1/38
[52] U.S. Cl. ..................... 375/219; 375/377; 370/85.1
[58] Field of Search ........................... 375/7, 8, 121, 375/36; 307/475; 370/85.1, 85.2, 85.3, 85.4, 85.5, 85.15, 95.1, 95.3, 85.7

[56] References Cited

U.S. PATENT DOCUMENTS

| | | | |
|---|---|---|---|
| 5,040,172 | 8/1991 | Mano et al. | 370/95.1 |
| 5,090,013 | 2/1992 | Fadem | 370/85.1 |
| 5,185,737 | 2/1993 | Nassehi et al. | 370/85.15 |
| 5,231,635 | 7/1993 | Travers et al. | 370/95.3 |

*Primary Examiner*—Stephen Chin
*Assistant Examiner*—T. Ghebretinsae
*Attorney, Agent, or Firm*—Leonard A. Alkov; W. K. Denson-Low

[57] ABSTRACT

A system for communicating signals within a digital network without the aid of an array of separate signal lines or of the system data bus. The network communication system 10 of the present invention is operative in accordance with a time-sliced protocol to communicate signal information among a set of digital modules 1. The communication system 10 includes a driver network for transmitting signal information to a first interface circuit 14 in communication with a first 22 of said modules during a selected interval of an interval cycle. The first interface circuit 14 includes an input network 44 for receiving the transmitted information during the selected interval. The inventive network communication system 10 further includes a kickstart circuit 30 for initiating an interval cycle upon the transmission of signal information within the network 10, or upon the execution of a maximum (Nth) interval of a preceding interval cycle.

11 Claims, 3 Drawing Sheets

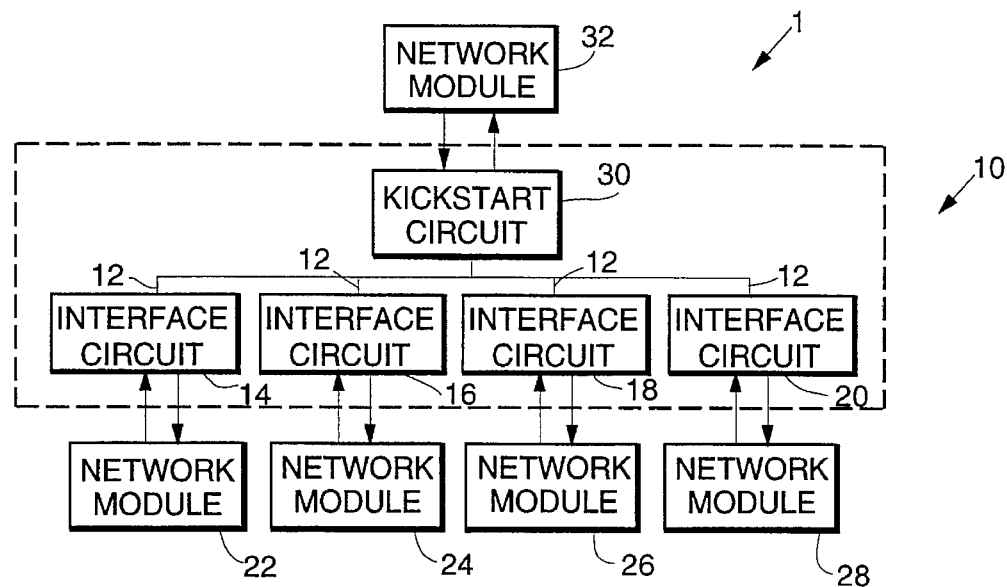
FIG. 1.
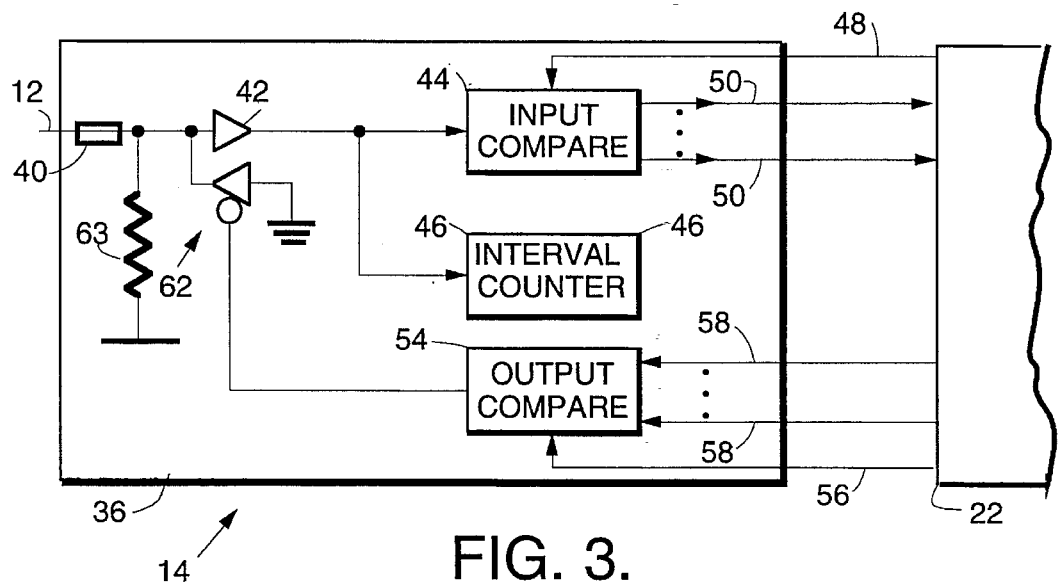
FIG. 3.
FIG. 4.
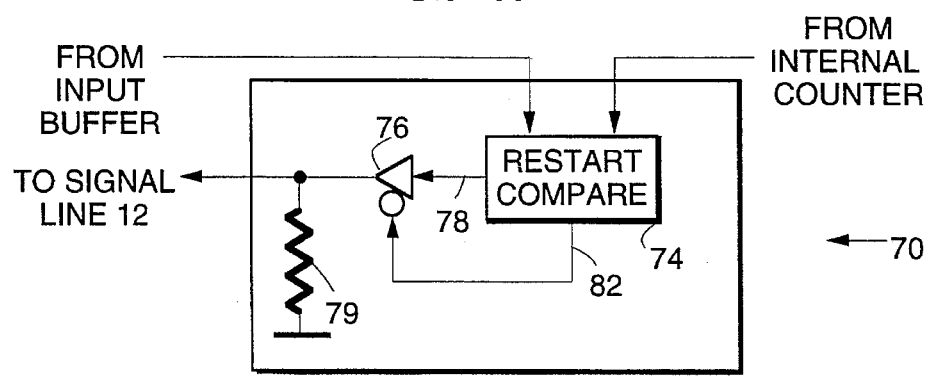

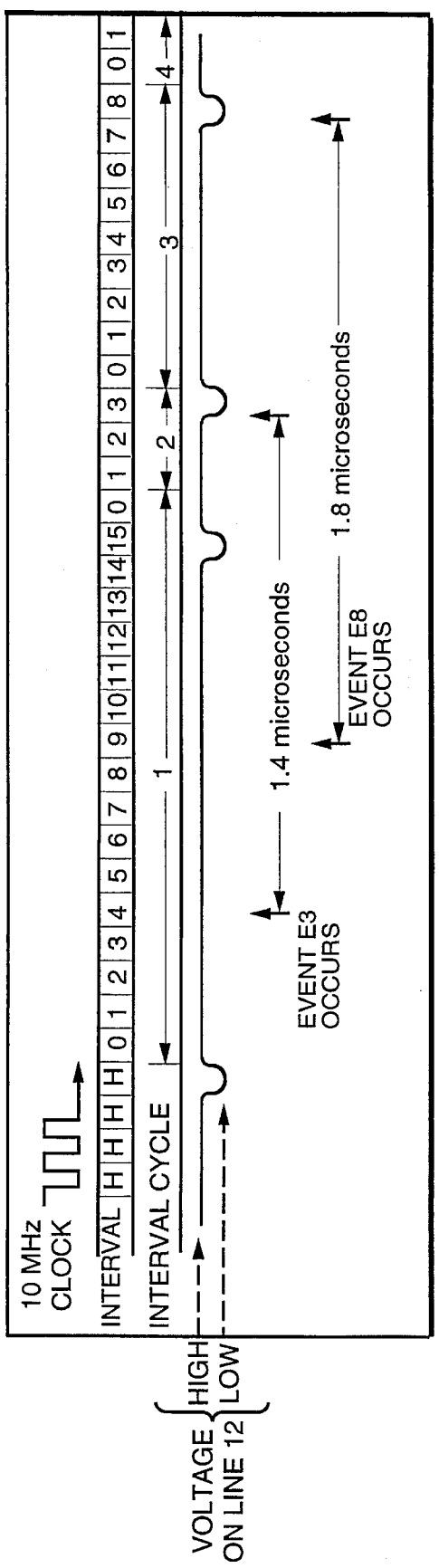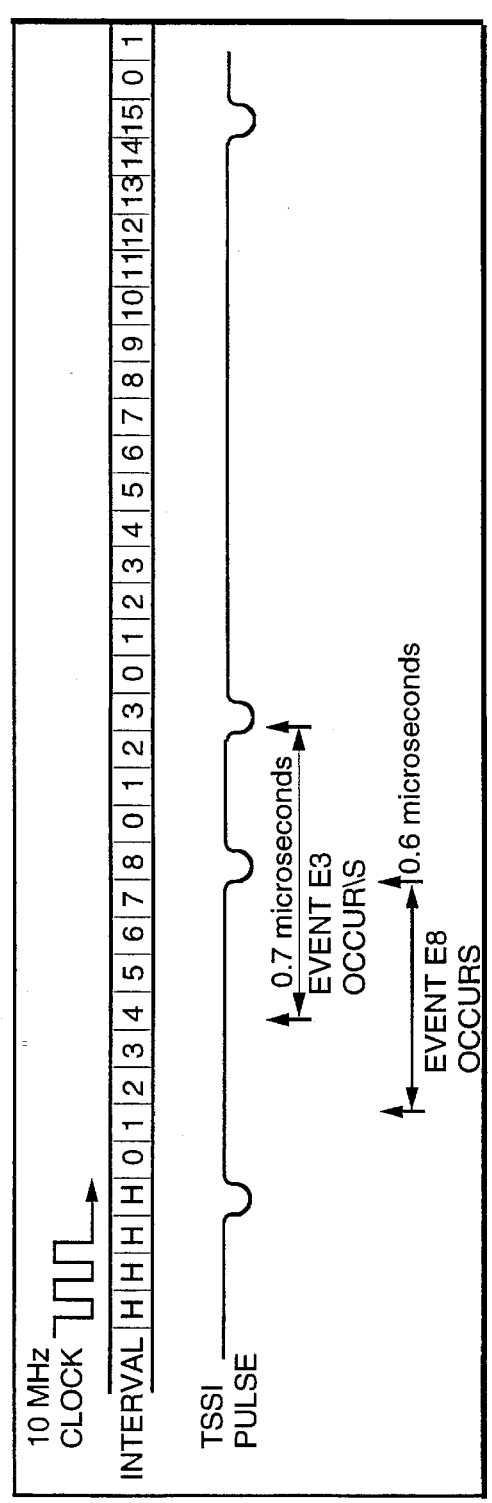

NETWORK COMMUNICATION SYSTEM HAVING TIME-SLICED PROTOCOL

GOVERNMENT RIGHTS

The invention was made with Government support under Contract F33657-86-C-2085 awarded by the Department of the Air Force. The Government has certain rights in this invention.

BACKGROUND OF THE INVENTION

1. Field of the Invention:

This invention relates to digital systems having a network of discrete hardware modules. More specifically, this invention relates to techniques for transmitting information such as status or interrupt signals within such networks.

While the present invention is described herein with reference to a particular embodiment, it is understood that the invention is not limited thereto. Those having ordinary skill in the art and access to the teachings provided herein will recognize additional embodiments within the scope thereof.

2. Description of the Related Art:

Many contemporary digital systems rely on a number of processors to perform complex, real-time applications. During the course of such real-time processing it is often necessary for one processor to interrupt or otherwise signal another processor. Specifically, each processor is typically programmed with a list of event occurrences (e.g. interrupt or error conditions) required to be communicated to other processors or hardware modules within the digital system.

At least two methods are commonly employed for communicating interrupt and event information among the processors and other modules within modern digital systems. In a first method the various components of the system are interconnected through a network of discrete interrupt lines. A separate line is required to transmit each event or interrupt signal from a particular module or processor to the remaining components within the system. Thus, sixteen separate interrupt lines would be required in a system having eight modules if each module were to provide a pair of interrupts to the others. In addition, each module would generally need to be outfitted with sixteen distinct input/output (I/O) ports. As a further example, a system having twelve modules—each disposed to generate five interrupt signals—would conventionally require sixty distinct interrupt lines. It is apparent that such an approach may result in systems burdened with a relatively large number of interrupt lines. Thus, a network of discrete interrupt lines may make large-scale systems relatively unwieldy and expensive.

In a second method, interrupt signals are conveyed on the system bus linking each of the modules within the network. In addition to transmitting interrupt messages, the bus is typically operative to transfer large quantities of data between modules in accordance with an established protocol. The interrupt messages must be designed to be compatible with this protocol. This may, in some instances, be extremely inconvenient. Moreover, the inclusion of interrupt messages on the bus reduces the available bus capacity to transfer data and other information between modules. Finally, the bus protocol may operate to delay unacceptably certain interrupt signals during periods of intense network activity.

Accordingly, a need in the art exists for a system to communicate signals among modules within a digital network without utilizing the system bus or a plurality of discrete interrupt lines.

SUMMARY OF THE INVENTION

The need in the art for a system for communicating signals within a digital network, without the aid of an array of separate signal lines or the system data bus, is addressed by the network communication system of the present invention. The communication system is operative in accordance with an inventive time-sliced protocol to communicate signal information among a set of digital modules. In a specific embodiment, the communication system includes a driver network for transmitting signal information to a first interface circuit in communication with a first of said modules during a selected interval of a time-sliced interval cycle. The first interface circuit includes an input network for receiving the transmitted information during the selected interval. The inventive network communication system further includes a kickstart circuit for initiating an interval cycle upon the transmission of signal information within the network, or upon the expiration of a maximum (Nth) interval.

BRIEF DESCRIPTION OF THE DRAWINGS

FIG. 1 shows an illustrative block diagram of a digital network which includes a preferred embodiment of the network communication system of the present invention.

FIG. 3 is a partially schematic, partially block diagrammatic representation of a specific hardware implementation of a first interface circuit included within the communication system of the present invention.

FIG. 4 shows a protocol reset network included within a kickstart circuit of the inventive communication system.

FIGS. 6 and 7 are timing diagrams which show an event-priority feature of the inventive time-sliced protocol.

DETAILED DESCRIPTION OF THE INVENTION

Figure 2:
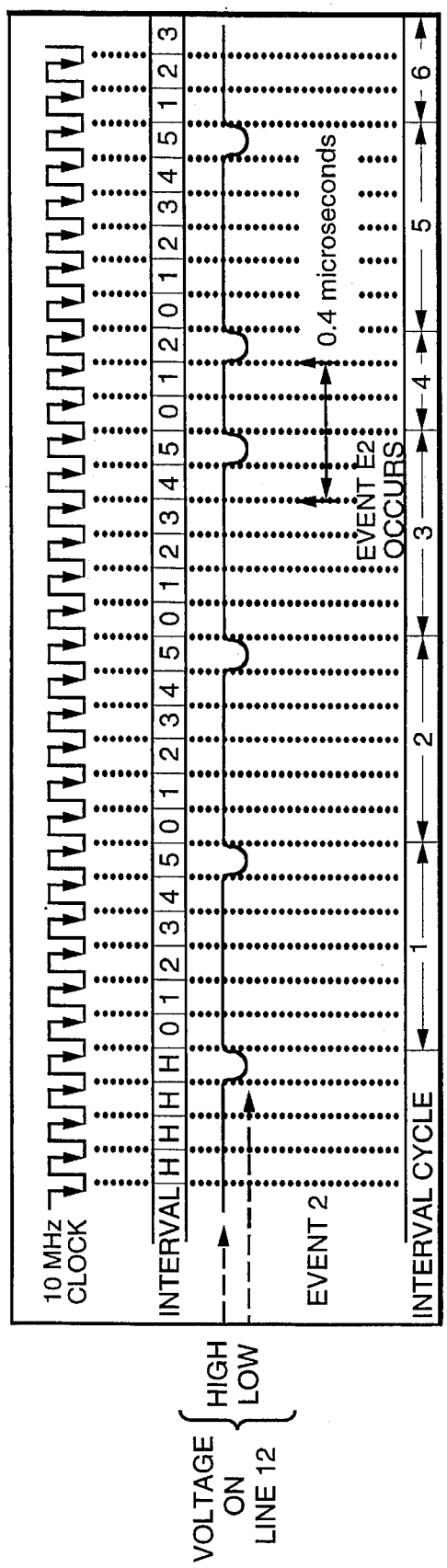
FIG. 2 is a timing diagram illustrating a manner in which a time-sliced protocol governs operation of the inventive communication system.

FIG. 1 shows an illustrative block diagram of a digital network 1 which includes a preferred embodiment of the network communication system 10 of the present invention. The inventive network 10 includes a digital signal line 12 which links first, second, third, and fourth module interface circuits 14, 16, 18 and 20. The interface circuits 14, 16, 18 and 20 are operatively coupled to first, second, third and fourth network modules 22, 24, 26 and 28. The inventive network further includes a kickstart interface circuit 30 also linked to the signal line 12. The kickstart interface circuit 30 is operatively coupled to a fifth network module 32. The network modules represent digital processors or other digital hardware disposed to utilize the inventive system 10 to communicate signal information (e.g. interrupt or event-occurrence signals) throughout the network 1.

As is described hereinafter, the inventive system 10 operates in accordance with a time-sliced protocol to transmit signal information between the network modules. The time-sliced protocol is defined over a continuous sequence of interval cycles, with each interval cycle including a maximum (N) number of intervals. Each interval coincides with a period of a system clock (not shown), and thus each interval cycle spans a maximum of N clock periods. Each network module is disposed to signal the occurrence of predefined events or interrupt conditions therein during the same interval (or intervals) of each interval cycle. In this way the particular network module causing a signal to be issued during a given interval may be identified. Upon the issuance of a signal by one of the network modules the current interval cycle is terminated and a new interval cycle is commenced. If a signal is not issued by one of the network modules during the N intervals of an interval cycle, the cycle expires at the conclusion of the Nth interval and a succeeding cycle immediately follows.

As shown in FIG. 1, the digital signal line 12 is distributed among the interface circuits so as to place each of the network modules in electrical communication. The signal line 12 may be realized with, for example, a printed wiring board with each of the interface circuits being linked thereto via an input/output (I/O) pin. The time-sliced protocol utilized by the system 10 of the present invention is designed to operate at the clock rate of the network 1. The clock rate of the network 1 should be chosen such that a voltage impressed on the signal line 12 by, for example, the first interface circuit 14 could be detected by the fourth interface circuit 20 within one clock period (one interval of the time-sliced protocol). Accordingly, effects such as the capacitive loading associated with the line 12 should be considered when selecting the system clock rate and the length of the line 12.

Each interface circuit includes a transistor driver to pulse the signal line 12 to a low state upon the occurrence of an event or interrupt condition within the network module associated therewith. In particular, an interface circuit may transmit a pulse by driving the line 12 to a low state for one interval and returning to a disabled (non-driving) state during the subsequent interval. The kickstart circuit 30 then drives the signal line back to a quiescent (high) state during the interval immediately following an interval in which a pulse was transmitted. Again, each interface circuit is programmed or otherwise configured as specified herein to pulse the signal line 12 to a low state during a particular interval of the interval cycle in response to the occurrence of an event within the module associated therewith.

FIG. 2 is a timing diagram illustrating the manner in which the time-sliced protocol governs operation of the inventive communication system 10. A first interval cycle of the time-sliced protocol is initiated by the kickstart circuit 30, which drives the line 12 to a low state for one interval. The subsequent clock cycle (interval) is denoted as interval 0, during which time the signal line is driven high to the quiescent state. As shown in FIG. 2, the first interval cycle also includes intervals 1, 2, 3, 4 and 5. Each of the interface circuits 14, 16, 18 and 20 as well as the kickstart circuit 30 include an internal counter for maintaining a record of the interval count.

As shown in FIG. 2, a first, a second and a third interval cycle each include five intervals (N=5). The kickstart circuit 30 is programmed to drive the signal line 12 low at the fifth (Nth) interval in order to commence the following interval cycle. The internal counters within each interface circuit as well as in the kickstart circuit 30 are then reset to zero in response to the pulse issued during interval five. Each internal counter will continue to increment the interval count until the line 12 is driven low, thus allowing the maximum number of intervals (N) within each cycle to be controlled simply by specifying the interval in which the kickstart circuit 30 pulses the line 12 to the low state.

As mentioned above, each of the network modules 22, 24, 26, 28 and 32 are associated with a specific interval count. As an example, assume that the occurrence of a predefined event E1 (e.g. an address breakpoint) in the first module 22 should cause processing within a central processing unit (CPU) of the second module 24 to be interrupted. If the first module 22 is associated with the second interval, then the first interface circuit 14 will be programmed to pulse the line 12 at an interval count of two if the event E1 has occurred within the module 22. This situation may be described with reference to the third and fourth interval cycles depicted in FIG. 2.

As shown in FIG. 2, an address breakpoint (event E1) occurs in the first module 22 at the conclusion of the third interval of the third interval cycle. Upon reaching an interval count of five the kickstart circuit 30 then pulses the line 12 low in order to commence the fourth interval cycle. When the interval count reaches two during the fourth interval cycle, the first interface circuit 14 drives the signal line 12 low to indicate the occurrence of event E1 in module 22. The second interface circuit 16 would be programmed or otherwise configured to send a CPU interrupt signal to the module 22 upon detecting the low impressed on the signal line 12 by the circuit 14. As noted above, the impression of a low on the signal line 12 triggers the interval count to reset to zero. Accordingly, the circuit 14 commences a fifth interval cycle by pulsing the line 12 to the low state. If the clock rate of the system 1 is 10 MHz, then approximately 0.4 microseconds elapses between occurrence of the event E1 and pulsing of the line 12 by the circuit 14.

FIG. 3 is a partially schematic, partially block diagrammatic representation of a specific hardware implementation of the first interface circuit 14. The interface circuit 14 may be mounted on, for example, a printed wiring board 36. The signal line 12 communicates with the interface circuit 14 via an I/O pin 40. An input buffer 42 (typically CMOS or TTL) relays the voltage present on the line 12 from the I/O pin to an input compare network 44 and to an interval counter 46. The input compare network 44 includes a first register (not shown) for storing input compare parameters transferred thereto via a first interconnection line 48. The input compare parameters indicate the intervals during which pulsing of the line 12 to a low state should induce the compare network 44 to send an interrupt or other signal to the first module 22 via one of a set of second interconnection lines 50. For example, assume an error condition in the fourth module 28 should cause a CPU interrupt to occur in the first module 22. Further assume that the fourth module is disposed to pulse the signal line 12 low during the fourth interval in response to the existence of the error condition. In this instance a "4" would be stored in the first register of the compare network 44. In addition, one of the lines 50 would send a CPU interrupt signal to the module 22 in response to a low voltage being transferred from the line 12 to the network 44 by the buffer 42 during the fourth interval.

The first interface circuit 14 also includes an output compare network 54. The output network 54 includes a second register (not shown) for storing output parameters transferred thereto from the module 22 via a third interconnection line 56. The output parameters correspond to the intervals during which the interface circuit 14 is designated to pulse the signal line 12 to a low state in response to the occurrence of particular events (e.g. an interrupt or error condition) within the module 22. The occurrence of a specific event is communicated to the output compare network 54 by way of one of a set of fourth interconnection lines 58. Again, when the interval count in the second register matches the interval count indicated by the interval counter 46 the output compare network 54 will determine whether the specified event has occurred within the module 22. If the event has occurred, the compare network 54 will signal an output driver 62 (typically TTL or CMOS) to impress a low voltage upon a pull-up resistor 63. The voltage across the resistor 63 appears on the signal line 12 by way of the I/O pin 40. The second, third and fourth interface circuits 16, 18 and 20 may be realized from hardware configurations substantially identical to that of the first module 22 shown in FIG. 3.

FIG. 4 shows a protocol reset network 70 included within the kickstart circuit 30. The kickstart circuit 30 may be synthesized by appending the restart network 70 to an interface circuit such as the first interface circuit 14 shown in FIG. 3. As shown in FIG. 4, the restart network 70 includes a restart compare circuit 74 coupled to the interval counter and to the input buffer of the associated interface circuit. The restart compare network addresses the input port of a transistor driver 76 via an input line 78, and an enable port of the transistor 76 via an enable line 82.

In a first operative mode the protocol reset network 70 operates to restore the signal line 12 to a high logical state after a logical low has been impressed thereon. Specifically, upon detecting a low state on the signal line 12 via the restart circuit 74 sets the enable line 82 to an ON condition and raises the input line 78 to a logical high. In this way a voltage high is impressed upon a pull-up resistor 79 by the driver 76, thus restoring the voltage on the line 12 to the high (quiescent) condition. Similarly, the reset network 70 is disposed to operate in a second mode when the interval counter is incremented to the maximum interval N. In this latter mode the restart circuit 74 sets the enable line 82 to the ON condition and impresses a logical low on the input line 78. This results in the low voltage being impressed upon the line 12 for a single interval, thus initiating another interval cycle.

Figure 5:
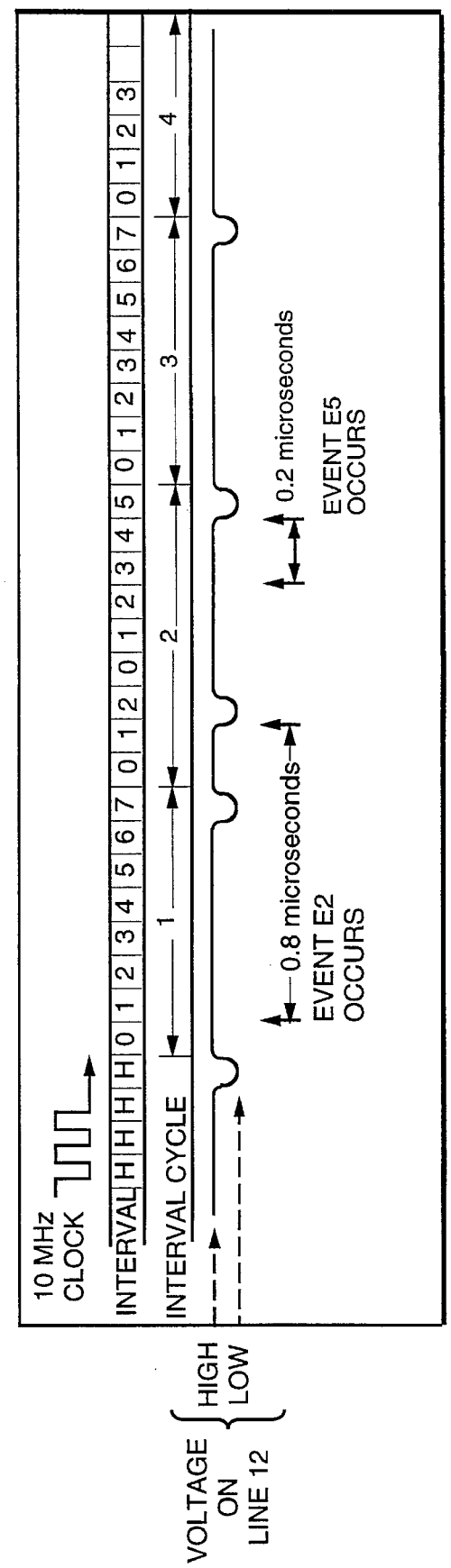
FIG. 5 is a timing diagram which illustrates operation of a version of the inventive time-sliced protocol wherein the kickstart circuit has been set to limit each interval cycle to a maximum of seven intervals (N=7).

FIG. 5 is a timing diagram which illustrates operation of a version of the inventive time-sliced protocol wherein the kickstart circuit 30 has been set to limit each interval cycle to a maximum of seven intervals (N=7). For the purpose of describing FIG. 3, assume that the occurrence of predefined events E2 and E5 within the first and second modules 22 and 24 will be signaled during the second and fifth intervals, respectively.

As shown in FIG. 5, event E2 occurs within the first module 22 during the first interval of a first interval cycle. Again, the kickstart circuit 30 initiates a second interval cycle during the seventh interval of the first interval cycle by impressing a low voltage upon the line 12. In addition, the circuit 30 impresses the high voltage upon the line 12 during interval zero of the second interval cycle. In response to the occurrence of event E2 within the module 22, the first interface circuit 14 pulses the line 12 to the low state during interval two of the second interval cycle. Upon detecting this low pulse, the kickstart circuit 30 again impresses the high voltage upon the line 12 during interval zero of a third interval cycle. As is also shown in FIG. 5, event E5 occurs within the second module 24 of the third interval cycle. The occurrence of event E5 triggers the second interface circuit 16 to pulse the signal line 12 to the low state during the fifth interval of the third interval cycle. The fourth interval cycle is then initiated immediately thereafter by the kickstart circuit 30 in the manner indicated above.

FIGS. 6 and 7 are timing diagrams which illustrate the event-priority feature of the inventive time-sliced protocol. In order to facilitate explanation of FIGS. 6 and 7, assume that the fourth interface circuit 20, and the kickstart circuit 30, are programmed to impress a low voltage upon the line 12 during the third and eighth intervals in response to the occurrence of events E3 and E8 within the modules 28 and 32, respectively. In addition, assume that the restart network 70 of the kickstart circuit 30 is operative to limit each interval cycle to fifteen intervals.

As shown in FIG. 6, event E8 occurs during the ninth interval of a second interval cycle. Eighteen intervals then elapse between the occurrence of event E8 and the pulsing of the line 12 by the circuit 30 during the eighth interval of a third interval cycle. In contrast, had event E3 not occurred the indication of the occurrence of the event E8 would have been delayed by only fourteen intervals. As shown in FIG. 7, event E3 occurs during the fourth interval of a first interval cycle. However, the occurrence of event E8 allows the line 12 to be pulsed in response to the happening of event E3 after a delay of only seven intervals. In contrast, indication of the occurrence of event E3 would have been delayed by fourteen intervals had event E8 not occurred. In this way it is seen that the line 12 will be pulsed in response to the occurrence of events assigned to intervals of lower number with less delay than in the case of events associated with higher intervals. Accordingly, the present invention allows the indication of the occurrence of high priority events to be expedited relative to events of lower priority by assigning high priority events to low interval counts.

It is noted that differing events within separate modules which induce an identical result (e.g. halting operation of the system 1) need not be assigned unique intervals. That is, if the source of the event causing the identical result does not require immediate identification, then all such events may be associated with the same interval. Auxiliary status registers may be added to the interface circuits to allow a subsequent identification of the specific module event precipitating the result.

While the present invention has been described herein with reference to a particular embodiment, it is understood that the invention is not limited thereto. The teachings of this invention may be utilized by one having ordinary skill in the art to make modifications within the scope thereof. For example, the invention is not limited to the particular hardware implementations of the interface and kickstart circuits given herein. Those skilled in the art will be aware of other circuit configurations capable of performing the communicative functions required by the inventive time-sliced protocol. The invention is further not limited to the specific characteristics of the pulse signals described herein. Other signal waveforms may be used to indicate a module interrupt condition or event occurrence.

It is therefore contemplated by the appended claims to cover any and all such modifications. Accordingly,

What is claimed is:

1. A system for communicating signal information among a set of modules comprising:

means for transmitting said signal information to a first interface circuit during a selected interval of a first interval cycle, said first interface circuit being in communication with a first of said modules, wherein said transmitting means is disposed in a second interface circuit and wherein said system further includes input compare means for identifying a second module as providing the information transmitted by said second interface circuit during said selected interval and wherein each of said interface circuits includes an interval counter for determining the commencement of each of said intervals within said interval cycles, and wherein each of said interval counters is operatively coupled to a signal line linking each of said interface circuits and is reset in response to the pulsing thereof by said modules, and wherein each of said interface circuits includes a driver amplifier for impressing a first voltage on said signal line during a predetermined interval in response to the occurrence of an event within said module;

means for receiving said transmitted signal information at said first interface circuit during said selected interval: and wherein each interface circuit includes an input compare network operatively coupled to said signal line and to said interval counter of said interface circuit, said compare network being operative to generate a module event enable signal in response to the impression of said first voltage on said signal line during a predetermined one of said intervals.

2. The system of claim 1 wherein said system further includes a signal line linking each of said interface circuits and wherein said transmitting means includes a driver for pulsing said signal line during said selected interval upon the occurrence of a detection of said first voltage.

3. The system of claim 1 wherein a plurality of said interface circuits include an output compare network wherein each output compare network is operatively coupled to said signal line and to said interval counter and driver amplifier of one of said plurality of interface circuits, said output compare network being operative to enable said driver amplifier of said interface circuit to impress said first voltage on said signal line.

4. The system of claim 1 further including a kickstart circuit for impressing a quiescent voltage on said signal line at the commencement of each interval cycle.

5. A digital network having a set of modules comprising:

a distributed signal line in electrical communication with a plurality of interface circuits in communication with said modules;

a first driver circuit disposed within a first of said plurality of interface circuits for impressing a first voltage upon said signal line during a selected interval of a first interval cycle;

means for detecting said first voltage at each of the plurality of said interface circuits;

means for resetting each of an interval counters upon said detection of said first voltage on said signal line; and wherein each of said interface circuit includes an interval counter for determining the commencement of each of said intervals within said interval cycles.

6. The network of claim 5 wherein each interface circuit includes a driver amplifier for impressing said first voltage on said signal line during a predetermined interval in response to the detection of said first voltage within an associated one of said modules.

7. The network of claim 6 wherein each interface circuit includes an input compare network operatively coupled to said signal line and to said interval counter of said interface circuit, said compare network being operative to generate a module event enable signal in response to the detection of said first voltage on said signal line during a predetermined one of said intervals.

8. The network of claim 7 wherein each interface circuit includes an output compare network, each of said output compare networks being operatively coupled to said signal line and to said interval counter and driver amplifier within one of said interface circuits.

9. The network of claim 5 further including a kickstart circuit for impressing a quiescent voltage on said signal line at the commencement of each interval cycle.

10. A method for communicating signal infomration among a set of modules comprising the steps of:

a) transmitting said signal information to a first interface circuit of a plurality of interface circuits, wherein each of said interface circuits is linked via a signal line, in communication with a first of said modules during a selected interval of a first interval cycle;

b) receiving said transmitted signal information at said first interface circuit during said selected interval of said first interval cycle;

c) enabling a second interface circuit to impress a first voltage upon said signal line during a Kth interval of any of said interval cycles;

d) identifying the presence of said first voltage upon said signal line during one of said Kth intervals, as a signal from a second module in communication with said second interface circuit;

e) associating a presence of a voltage within each of said modules with a predetermined interval within each interval cycle by enabling the interface circuit associated with each of said modules to impress said first voltage upon said signal line during said associated interval in response to said first voltage; and f) generating a signal within one of said interface circuits in response to the impression of said first voltage on said signal line during a predetermined one of said intervals.

11. The method of claim 10 further including the step of determining the commencement of each of said intervals.

\* \* \* \* \*